April 5, 1949.  L. E. HELDENBRAND  2,466,102
VERTICALLY ADJUSTABLE CATTLE TRUCK
Filed Sept. 19, 1947  2 Sheets—Sheet 2
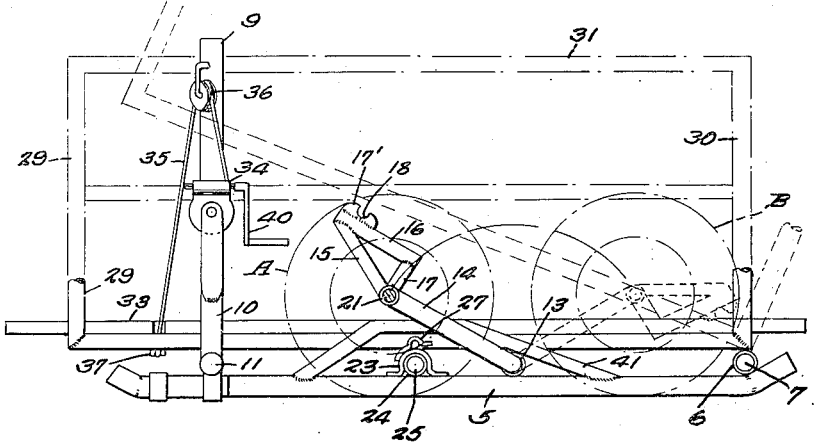
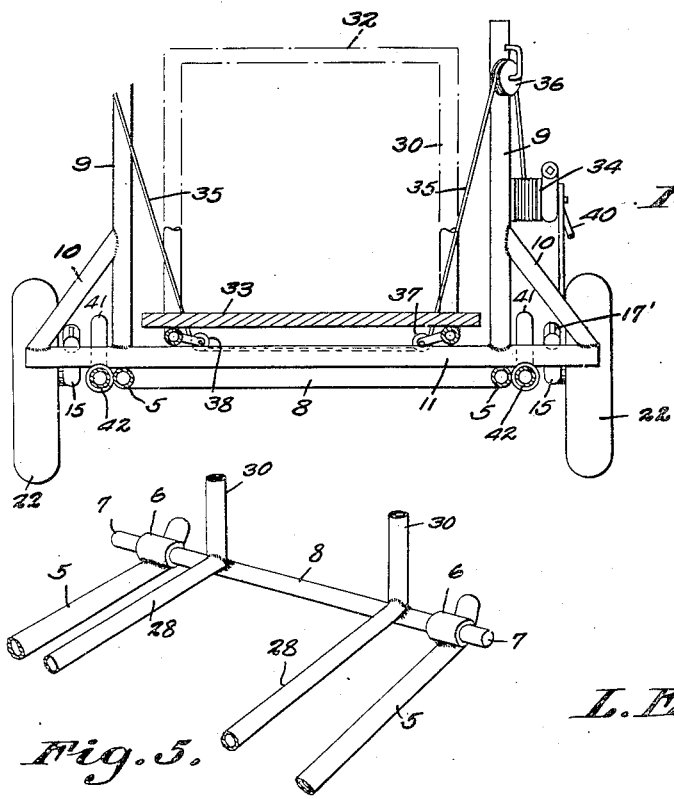
L. E. Heldenbrand
INVENTOR
BY C. A. Snowles.
ATTORNEYS.

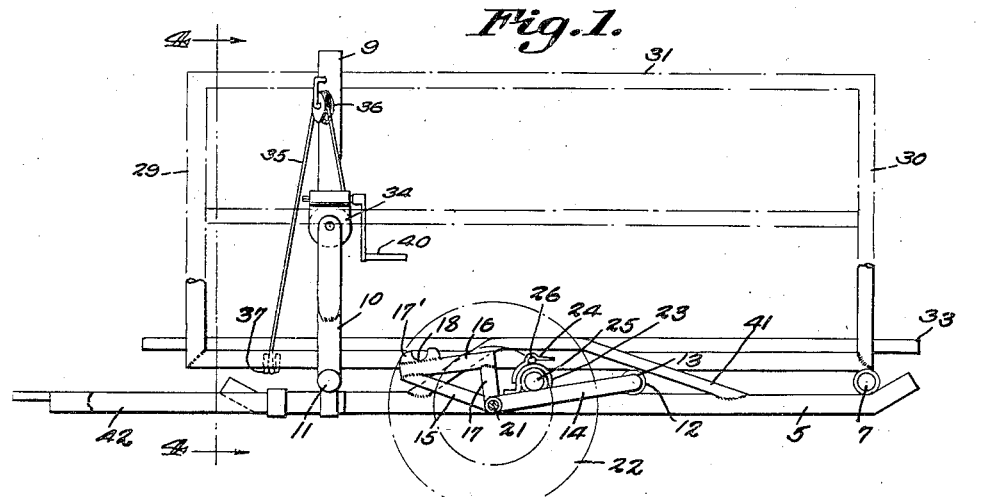
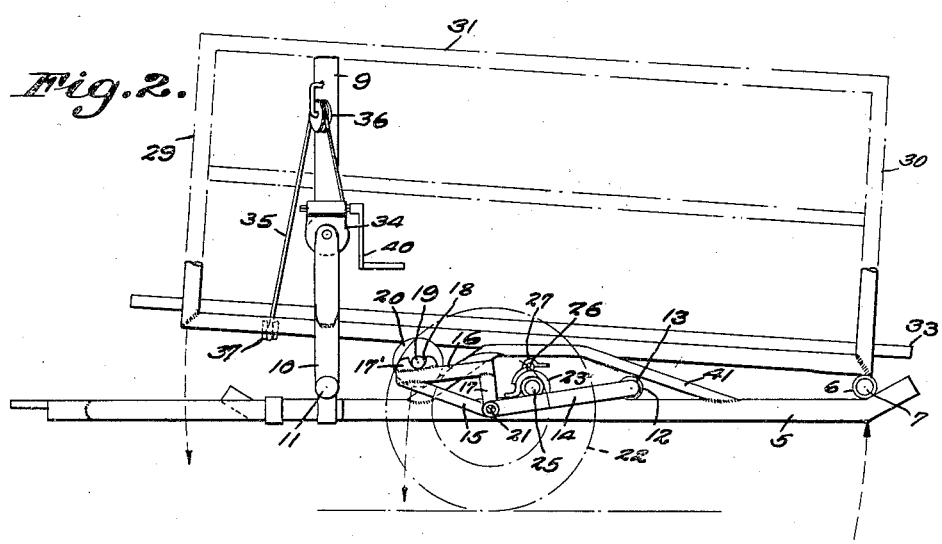
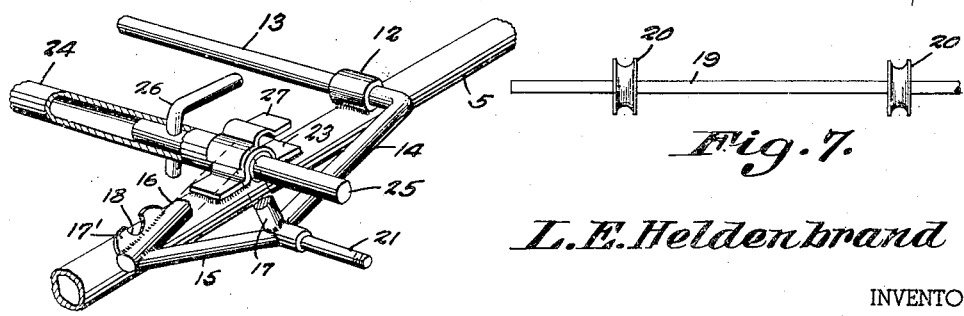

Patented Apr. 5, 1949

2,466,102

UNITED STATES PATENT OFFICE 2,466,102

VERTICALLY ADJUSTABLE CATTLE TRUCK

Laurance E. Heldenbrand, Oklahoma City, Okla.

Application September 19, 1947, Serial No. 775,048

6 Claims. (Cl. 280—44)

This invention relates to truck body construction and more particularly to truck bodies of the trailer type, especially designed for use in transporting and handling cattle, the primary object of the invention being to provide means whereby the truck body may be lowered to a position to contact with the ground surface, whereby the truck may be used as a chute for loading cattle into trucks or cars.

An important object of the invention is to provide a wheel mounting for the truck which is so constructed and arranged that the wheels may be elevated to a position allowing the truck body to lower to the ground surface, or may be moved to a position to elevate the truck body, the wheels moving into contact with the ground surface for supporting the truck body on the wheels, converting the truck body into a carrier for transporting animals.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a side elevational view of a wheel-supported truck, constructed in accordance with the invention.

Figure 2 is a side elevational view illustrating the body of the truck as partially elevated to relieve the supporting pins of the truck, of the weight of the body of the truck to permit the movement of the wheels to their inactive positions.

Figure 3 is a side elevational view of the truck illustrating the wheels as moved to their inactive positions, the wheels being shown in dotted lines as moved laterally, providing a clearance for easy access to the truck body through the side.

Figure 4 is a sectional view taken on line 4—4 of Figure 1.

Figure 5 is a fragmental perspective view illustrating the manner of pivotally mounting the truck body on the main truck frame.

Figure 6 is a fragmental perspective view illustrating the means for holding the wheels in their supported positions.

Figure 7 is an elevational view of the rod and rollers used in temporarily supporting the weight of the inner frame.

Referring to the drawings in detail, the truck comprises main side rails 5, to the rear ends of which are secured circular bearing members 6, in which the ends 7 of the rod 8 forming a part of the movable body of the truck, to be hereinafter more fully described, are pivotally held.

Adjacent to the forward ends of the main side rails 5, are upstanding posts 9, which are braced by means of the angular brace rods 10, which are welded to the transverse rod 11, welded to the main side rails 5, adjacent to the front ends thereof. The upper ends of the angular brace rods 10, are welded to the posts 9, as clearly shown by Figure 4 of the drawings.

Secured to the main side rails 5 at points intermediate the ends thereof, are tubular bearings 12 that rise from the outer surfaces of the side rails, which bearings accommodate the axle 13 which extends across the main truck body, the axle 13 having right-angled ends 14 that have upwardly inclined end portions 15 that are welded to the rods 16 that extend rearwardly from the free ends of the end portion 15 and downwardly as at 17 connecting with the arms 14, as clearly shown by Figure 6 of the drawings.

Rising from the outer ends of the rod 16, are ears 17' formed with notches 18 that are adapted to accommodate the rod 19 that carries rollers 20 thereon, the rod 19 being removable so that when it is desired to use the rod and rollers 20 to temporarily support the weight of the movable truck body, the rod may be positioned as shown by Figure 2 of the drawings. When the rod 19 has been used to accomplish its purpose, it may be then removed.

Stub axles 21 extend from the right-angled ends 14 of the axles 13 on which the wheels 22 are mounted.

Straps 23 are also secured to the upper surface of the main side rails 5 in which straps are held the ends of the tube 24 that extends across the main frame between the side rails 5. Mounted within the ends of the tube 24 are pins 25, which are of lengths to extend over the right-angled ends 14 of the axle, so that the weight of the truck will cause the pins to rest directly on the right-angled ends 14, supporting the weight of the truck. These pins 25 are provided with operating pins 26 that are adapted to swing under the clips 27 to hold the pins 25 in their active or supporting position.

The movable body or frame of the truck includes the rear rod 8, parallel side rods 28, and are connected at their forward ends by means of a transverse rod, and upstanding posts 29. Upstanding posts 30 are secured to the rod 6 and extend in parallel spaced relation with respect to each other, the upper ends of the posts 29 and 30 being connected by means of the parallel upper side rods 31. Transverse rods 32 connect the forward posts 29 and 30 at their upper ends, thereby providing the rectangular frame. The flooring for the movable frame is indicated by the reference character 33 and may be of any desired construction to permit of its ready removal for cleaning purposes. Mounted on one of the upstanding posts 9, is a windlass 34 over which the cable 35 operates, the cable also operating over the pulley 36 mounted at the upper end of one of the posts 9, as shown by Figure 4 of the drawings. This cable 35 also operates over pulleys 37 and 38, that are disposed under the movable frame, from which the cable 35 extends upwardly and connects with the opposite upstanding post 9, as at 39. An operating handle 40 operates the windlass 34 to wind or unwind the cable. It might be further stated that the cable operates through openings formed in the flooring, and that when the cable is wound on the windlass the forward end of the movable frame will be elevated, and when the windlass is operated in the opposite direction the movable frame will be lowered.

To further brace the side rails 5, brace rods 41 are provided and have their ends welded to the side rails as clearly shown by the drawings.

In the operation of the truck, assuming that the truck body is in the position as shown by Figure 1, which is the running position, or the position of the truck body when the truck is being used as a trailer, and it is desired to lower the truck body to the ground surface, so that the truck body may be used as a chute, it is only necessary to operate the windlass 34 to wind the cable 35 thereon, until the movable frame of the truck is elevated to the position as shown by Figure 2 of the drawings. The rod 19 with the rollers 20 may now be slipped under the movable truck, the rollers 20 contacting the rods 28. The weight of the truck will now be supported by the rod 19 and rollers 20. With the movable frame in this position, the pins 26 are removed so that pins 25 may now be moved inwardly away from the right-angled ends 14 of the axle 13, whereupon the weight of the truck will cause the truck body to descend to the ground surface, the right-angled ends 14 of the axle 13 swinging upwardly to the position as shown in dotted lines at A in Figure 3. The truck now rests directly on the ground surface, and the front end of the inner frame of the truck may be elevated, should it be desired to use the truck as a chute for loading stock into an elevated carrier.

Should it be desired to use the device as a means for restraining stock while they are being treated, the truck body may be moved to the position as shown by Figure 3, and in order that free access may be had to the interior of the truck from the side, the supporting wheels may be swung rearwardly to the dotted line position shown at B in Figure 3 of the drawings, leaving the sides open for the convenience of the operator.

It will, of course, be understood that the usual hitch indicated at 42, is provided for hitching the trailer to a suitable towing mechanism.

Having thus described the invention, what is claimed is:

1. A truck body construction, comprising a main frame, an inner frame, means for pivotally connecting one end of the inner frame to the main frame, an axle mounted on the main frame, the ends of the axle being extended at right angles and directed forwardly, stub shafts extended laterally from the right-angled ends on which wheels are mounted, sliding pins extending over the right-angled ends of the axle in contact therewith, normally restricting upward swinging movement of the right-angled ends, holding the wheels in their supporting positions, said pins being slidable inwardly disengaging the right-angled ends, whereby the truck body moves downwardly under its weight, resting on the ground surface, the wheels swinging upwardly to their inactive positions.

2. A truck body construction, comprising a main frame, an inner frame pivotally connected at one of its ends with the main frame, an axle mounted on the main frame, the ends of the axle being extended at right angles beyond the sides of the main frame and being extended forwardly, stub shafts extending laterally from the right-angled ends, on which wheels are mounted, stop pins mounted on the main frame and being extended over the right-angled ends of the axle in contact therewith, normally restricting upward swinging movement of the right-angled ends holding the wheels in their supporting positions, said pins being held in contact with the right-angled ends of the axle by the weight of the inner frame, means for supporting the weight of the inner frame independently of the pins, whereby said pins are moved to disengage the right-angled ends of the axle, the truck body lowering under its weight, said wheels and axle rotating to a position disengaging the ground surface.

3. A truck body construction, comprising a main frame, an inner frame mounted within the main frame, means for pivotally connecting one end of the inner frame to the main frame, an axle mounted on the main frame for pivotal movement with respect to the main frame, the ends of the axle being extended at right angles, stop pins on the main frame disposed over the right-angled ends of the axle and engaged by the right-angled ends of the axle, normally holding the right-angled ends of the axle against upward movement, means for holding the wheels at the forward ends of the right-angled end portions, said stop pins being held in contact with the right-angled end portions of the axle, by the weight of the truck body, means for elevating the truck body relieving the stop pins of the weight of the truck body, said stop pins adapted to move disengaging the right-angled ends of the axle, whereby the truck body moves downwardly into contact with the ground surface and the wheels swing upwardly out of contact with the ground surface.

4. A truck body construction, comprising a main frame, an inner frame, means for pivotally connecting one end of the inner frame to the main frame, an axle mounted on the main frame, the ends of the axle being extended at right angles, beyond the sides of the truck body, stub shafts extending from the right-angled ends of the axle, wheels mounted on the stub shafts, sliding pins mounted on the main frame and extending over the right angled ends of the axle in contact therewith, normally restricting upward swinging movement of the right angled ends, holding the wheels in their supporting positions, a windlass and cable mounted on the main frame, the cable being connected with the inner frame, whereby the inner frame is elevated by operating the windlass, means for positioning the wheels under the elevated inner frame, relieving the pins of the weight of the inner frame, whereby the pins are retracted the right-angled ends of the axle and wheels moving upwardly, lowering the truck body to an unmovable position on the ground surface.

5. A truck body construction, comprising a main frame, an inner frame, means for pivotally connecting the inner frame to the main frame, a supporting axle pivotally mounted on the main frame, the ends of the axle being extended at right angles beyond the sides of the main frame, stub axles extending laterally from the right-angled ends of the axle, wheels mounted on the stub axles, sliding pins mounted on the main frame, said pins being extended into the path of upward travel of the right-angled ends of the axle, restricting upward movement of the right-angled ends and holding the stub axles and wheels in their supporting positions, under the weight of the inner frame, forcing the pins into contact with the right angled ends of the axle, and means for elevating one end of the inner frame relieving the pins of the weight of the inner frame, and said pins being movable disengaging said right-angled ends of the axle, whereby said wheels are elevated to their inactive positions, and the main frame is lowered into a supporting position in contact with the ground surface.

6. A truck body construction, comprising a main frame, an inner frame, means for pivotally connecting one end of the inner frame to the main frame, a supporting axle mounted on the main frame at a point between the transverse center line of the main frame, and the rear end thereof, the ends of the axle being extended at right angles and normally extending forwardly to a point beyond the transverse center line of the truck body, stub axles extending laterally from the right-angled ends of the axle, wheels mounted on the stub axles, pins mounted on the main frame, said pins contacting with the right-angled ends normally holding the axle and wheels in a supporting position, means for elevating one end of the inner frame, extensions formed at the forward ends of the right-angled end portions of the axle, a rod carrying rollers adapted for positioning on the extensions when the frame is elevated, supporting the frame independently of the pins, when the frame is lowered, releasing the pins for forward movement out of the path of travel of upward movement of the right-angled ends, whereby the truck body moves downwardly into contact with the ground surface under the weight of the body, and the wheels swinging upwardly to their inactive positions.

LAURANCE E. HELDENBRAND.

REFERENCES CITED

The following references are of record in the file of this patent:

UNITED STATES PATENTS

| Number | Name | Date |
| --- | --- | --- |
| 2,147,076 | Ault | Feb. 14, 1939 |
| 2,439,581 | Robins | Apr. 13, 1948 |